June 28, 1938.   W. W. DAY   2,121,905
CRATE
Filed Feb. 13, 1937
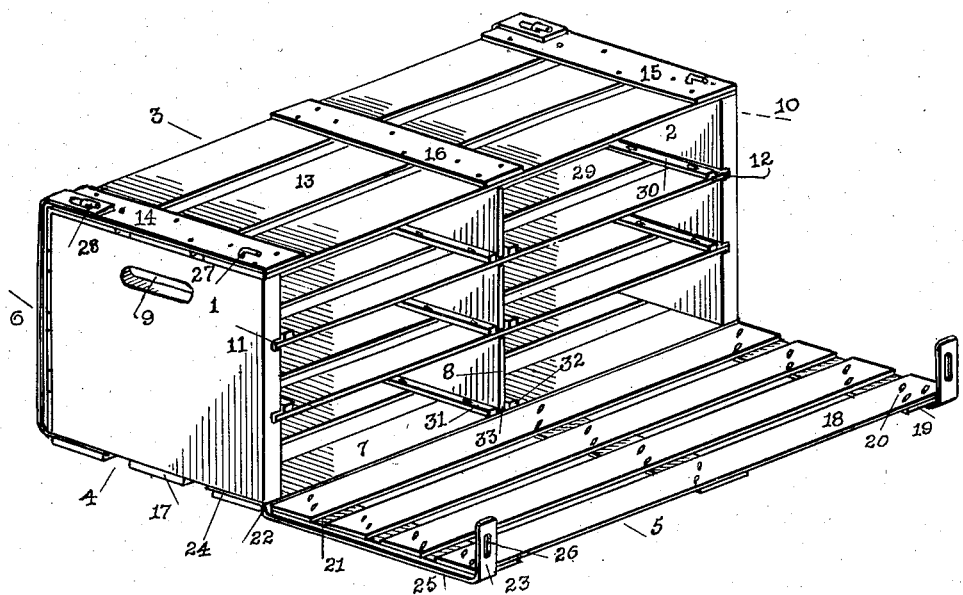
INVENTOR
William W. Day,
BY
Arthur Yancey,
ATTORNEY Patented June 28, 1938

2,121,905

UNITED STATES PATENT OFFICE 2,121,905

CRATE

William Walker Day, Hammond, La.

Application February 13, 1937, Serial No. 125,533

3 Claims. (Cl. 217—40)

My invention relates to improvements in shipping crates, being particularly adapted to holding a plurality of boxes of berries, fruit or vegetables.

An object of the invention is to provide a shipping crate having hinged sides, easily openable and securely closable, with laterally removable trays and partitions.

Another object of the invention is to provide a crate that will permit packing and inspection of all of the boxes of fruit to be contained without making or breaking fastenings of the crate body.

A further object of the invention is to reduce the weight of the crate and freight charges and to increase its strength and protection of the fruit against injury in transit.

These and other objects are attained by the invention, a simple form of which is illustrated and herein described in detail.

Referring to the drawing, the figure is an oblique projection of the crate showing one side opened, the other closed.

1 and 2 are the ends of the crate. 3 is the top, 4 the bottom, 5 the open side. 6 the closed side, 7 and 8 are respectively a laterally removable tray and partition. The ends of the crate are provided with hand holds 9 and 10 and horizontal grooves 11 and 12, the latter open inwardly and extending over the full width of the crate ends.

The top of the crate preferably consists of a plurality of longitudinal slats 13 nailed to the ends of the crate and spaced apart to facilitate ventilation of the fruit. Overlapping the slats are transverse terminal and central cleats, respectively 14 and 15 and 16.

The bottom of the crate is preferably made of slightly thicker slats 17 without re-inforcing cleats.

The sides are shown as made of longitudinal slats 18 and transverse, outwardly overlapping cleats 19 fastened with brads clinched as at 20. A flexible strap 21 secures the side to the crate body and provides a hinge 22 and latch member 23, the end of the strap being fastened between a bottom slat and crate end as at 24, and adjacently to the edge as at 25.

The latch member aforesaid is provided with a longitudinal slot 26 dimensioned to mate with an L-shaped turnable button 27, the slot being adapted to fit over the button and capable of holding the side closed and latched when the said button is turned, as shown at 28, or athwart the slot.

Trays are preferably made of a plurality of longitudinal slats such as 29, transverse terminal cleats 30 and a pair of central cleats 31 and 32, the latter being spaced apart to form a channel or trough. The terminal cleats are spaced from the ends of the slats to provide tongues to mate with the aforesaid grooves in the crate ends, the grooves and tongues being fitted to permit the trays being freely inserted or withdrawn from either side of the crate when open.

Vertical partitions 33 are freely mounted in the troughs aforesaid, and may be inserted or withdrawn from either side of the crate when it is open. The height of the partition should be such as will make a snug or tight fit when in place. This will support the top of the crate when the crates are piled one on the top of another, and will also help to keep the partitions in place when the crates are empty.

The illustrative crate is designed to provide six compartments, each to contain four boxes of fruit.

When packing the fruit, the sides of the crate are unlatched and opened, the boxes of fruit being then placed in the compartments from either side of the crate.

Any or all of the boxes of fruit may be inspected by unlatching and opening the sides of the crate and drawing out the trays, without handling the boxes of fruit or breaking any of the fastenings. The flexible band not only provides a hinge for the side, but strengthens the crate and permits use of thinner slats reducing weight of the crate and cost of shipping.

For the purpose of disclosure I have illustrated one form only of the invention, aware that it may be embodied in other forms, with the understanding that it is not limited to the exact details shown, but is to be measured by the appended claims which cover the combinations set forth and their equivalents.

I claim:

1. A ventilated crate adapted for being simultaneously loaded from its opposite sides with a separate series of berry boxes on each side, consisting of slatted top, bottom, sides and horizontal partitions, with slats of each spaced apart for ventilation, end members provided with means for supporting said top and bottom in fixed relation and said partitions in slidable relation, said sides being hingedly connected to the crate and having latching means mounted thereon.

2. A ventilated crate adapted for being simultaneously loaded from its opposite sides with a separate series of berry boxes on each side, consisting of slatted top, bottom, sides and horizontal partitions, with slats of each spaced apart for ventilation, end members provided with means for supporting said top and bottom in fixed relation and said partitions in slidable relation, and vertical partitions supported in slidable relation by said horizontal partitions and bottom, said sides being hingedly connected to the crate and having latching means mounted thereon.

3. A ventilated crate adapted for being simultaneously loaded from its opposite sides with a separate series of berry boxes on each side, consisting of slatted top, bottom, sides and horizontal partitions, with slats of each spaced apart for ventilation, end members provided with means for supporting said top and bottom in fixed relation and said partitions in slidable relation, vertical partitions supported in slidable relation by said horizontal partitions and bottom and a plurality of reinforcing bands, connecting said sides to the crate, providing hinges and latches for manually opening the sides.

WILLIAM WALKER DAY.